United States Patent

[11] 3,568,143

[72] Inventor Paul J. Naquin, Jr.
Bartlesville, Okla.
[21] Appl. No. 871,518
[22] Filed Oct. 17, 1969
[45] Patented Mar. 2, 1971
[73] Assignee Phillips Petroleum Company
Continuation of application Ser. No. 237,830, Nov. 15, 1962, abandoned. This application Oct. 17, 1969, Ser. No. 871,518

[54] DETERMINATION OF TIME DISPLACEMENT BETWEEN COMMON INFORMATION IN SEISMIC SIGNALS
7 Claims, 8 Drawing Figs.

[52] U.S. Cl. .................................................. 340/15.5, 235/181
[51] Int. Cl. .................................................. G01v 1/28
[50] Field of Search .................................................. 340/15.5 (RRC)

[56] References Cited
UNITED STATES PATENTS

| | | | |
|---|---|---|---|
| 2,902,107 | 9/1959 | Erath et al. ................ | 340/15.5 |
| 2,907,400 | 10/1959 | Swafford ...................... | 340/15.5 |
| 2,927,656 | 3/1960 | Feagin et al. ................. | 340/15.5 |
| 2,989,726 | 6/1961 | Crawford et al. ............. | 340/15.5 |
| 3,026,966 | 3/1962 | Cox et al. .................... | 235/181 |
| 3,036,775 | 5/1962 | McDermid et al. ........... | 343/100.7 |
| 3,112,397 | 11/1963 | Crook .......................... | 340/15.5 |
| 3,217,289 | 11/1965 | Elliot et al. ................... | 340/15.5 |

OTHER REFERENCES

Levin et al., A five Channel Analog Correlator, " Teletech 8" Elect. Ind., Mar. 1953, pp. 70— 71, 73, 125. IBM, Ref. Manual No. A22-6528-3, 7090 Data Proc. Sys. IBM, Ref. Manual No. A22-6535. IBM, Ref. Manual No. D22-6508-2

Primary Examiner— Rodney D. Bennett, Jr.
Assistant Examiner—Daniel C. Kaufman
Attorney—Young & Quigg

ABSTRACT: Automatic data processing apparatus is utilized to facilitate interpretation of seismic field data obtained from a field setup having a plurality of seismometer stations and a plurality of shot points. Vibrations are imparted to the earth at a first shot point and the reflected seismic signals are measured at a plurality of seismometer stations. The signals from adjacent pairs of seismometer stations are cross correlated to form a cross correlation signal. The procedure is repeated with the same pairs of seismometer stations for other shot point locations. The cross correlation signals for a given pair of seismometer stations are summed to form a composite cross correlation signal. The time difference value for each pair of seismometer stations is then plotted against the location of the pair to form a time difference curve, which can then be subjected to running integration to obtain a dip curve indicative of the dip of the subsurface formations. The subtraction of the dip curve from the time difference curve produces a time correction curve, which is indicative of the time corrections to be applied to the original data.

INVENTOR.
P. J. NAQUIN

INVENTOR.
P. J. NAQUIN

ATTORNEYS

DETERMINATION OF TIME DISPLACEMENT BETWEEN COMMON INFORMATION IN SEISMIC SIGNALS

This application is a continuation of my copending application Ser. No. 237,830, filed Nov. 15, 1962, and now abandoned.

This invention relates to the identification of selected vibration patterns in signals which contain noise vibrations. In another aspect it relates to the interpretation of seismic signals.

In various analysis systems there is a need for procedures which are capable of recognizing preselected vibration patterns in electrical signals. One example of such a need occurs in the field of seismic prospecting. The desired reflection patterns in recorded seismic signals are often obscured by the presence of random noise vibrations. While various schemes have been proposed for modifying and manipulating these records to increase the signal to noise ratio, it finally becomes necessary to identify individual peaks in the records which are representative of the desired reflections. Heretofore, this has generally been accomplished by an operator visually observing the individual peaks. It is readily apparent that such a system can be both time consuming and the subject of various errors.

One specific problem that is encountered in seismic prospecting is the determination of travel times of vibrations which move downwardly from the surface of the earth and are reflected back from subterranean formations. The travel times from a common shot point to adjacent seismometers are often appreciably different because the vibrations travel through beds having different transmission velocities. Travel time is also affected by the dip in the reflecting formation. These different travel times must be known in order to compare records received by a plurality of geophones.

In accordance with the present invention, a procedure is provided for comparing common vibration patterns in a plurality of signals to determine the relative times at which the patterns occur. This is accomplished by cross correlation functions which are made with the signals displaced from one another by progressively different amounts. A plurality of cross correlation functions are made for each pair of geophone locations by utilizing each pair of geophone locations for a plurality of shot points. The cross correlation functions for a given pair of geophone locations are added to obtain a composite cross correlation curve having increased accuracy. The time difference indicated by the location of the maximum peak of each composite correlation curve is plotted for a series of pairs of geophone locations. The resulting time difference curve is indicative of the dip of the reflecting formation as well as the difference in travel time due to varying thickness of beds having different transmission velocities. A running integral of the curve is made and can be plotted. The curve of the running integral is indicative of the dip of the reflecting formation and can be subtracted from the time difference curve to give a time correction curve which is indicative of the difference in travel time between a pair of geophone locations due to varying thickness of beds having different transmission velocities. The appropriate value of time correction is selected from the time correction curve and is applied to the respective original signal. The original signals which have been time corrected in accordance with this invention are then ready for inspection or further processing.

Accordingly, it is an object of this invention to provide a system for measuring differences between travel times of selected vibrations in a plurality of seismic records.

Another object is to provide a system for identifying preselected vibration patterns in the presence of random noise vibrations.

A further object is to provide a system for manipulating seismic records so as to identify selected reflection patterns in the presence of random noise vibrations.

Another object is to provide a system for determining the dip of a reflecting formation from a plurality of seismic signals.

Other objects, aspects, and advantages of the invention will be apparent from a study of the disclosure, the appended claims and the accompanying drawing in which:

Figure 2:
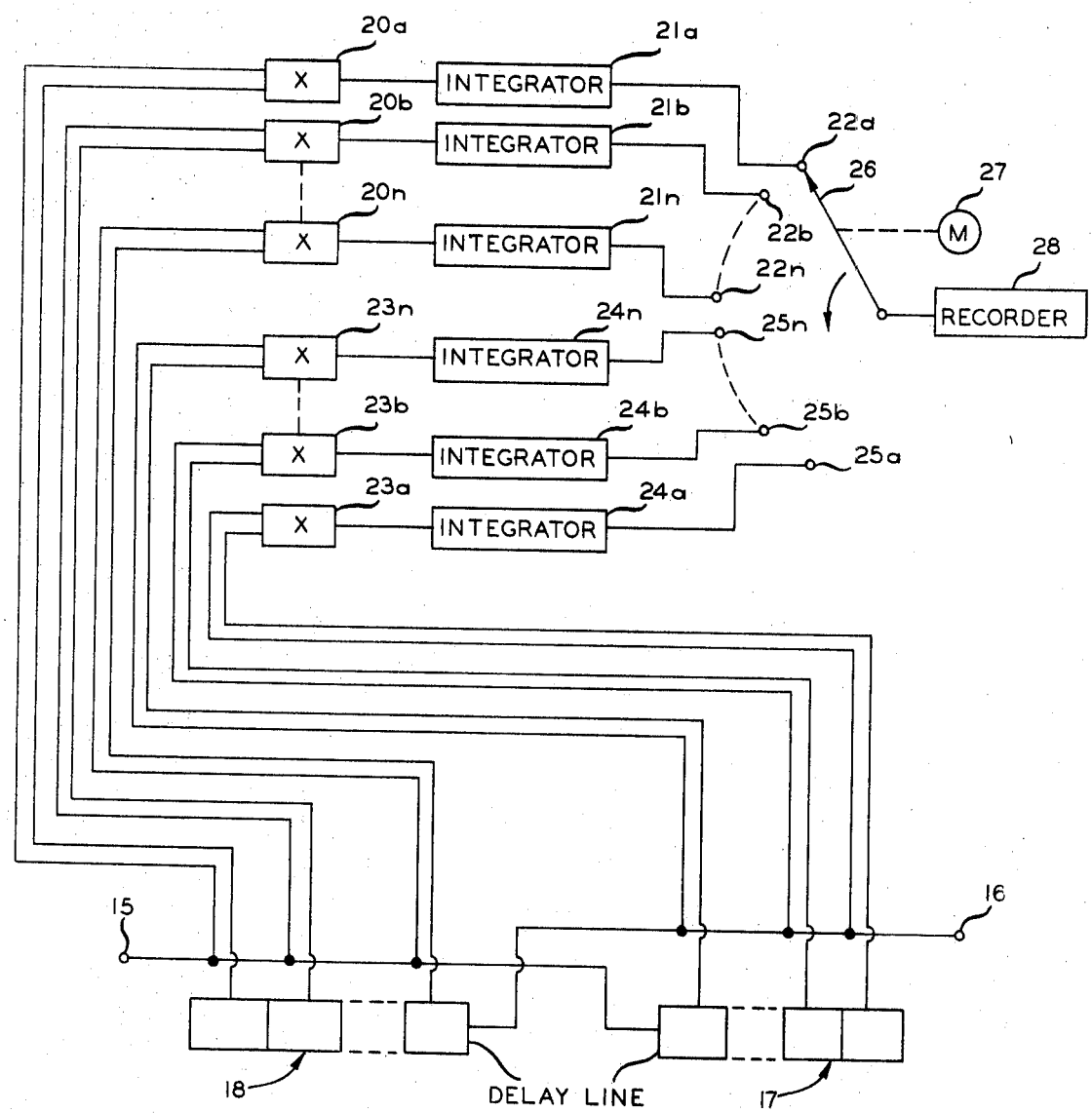
FIG. 2 is a schematic circuit drawing of apparatus employed to correlate the signals obtained by the system of FIG. 1.
Figure 4:
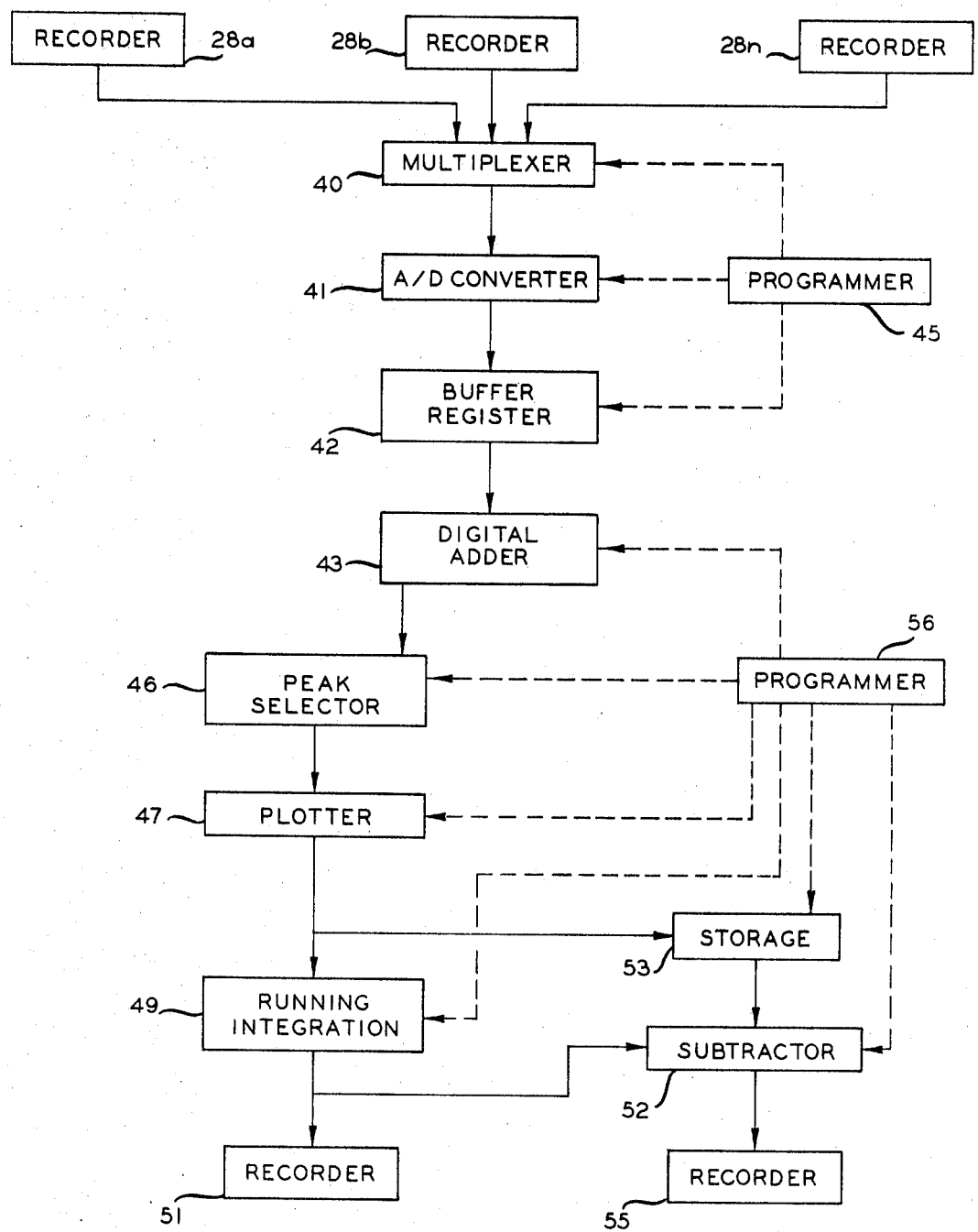

FIG. 4 is a schematic representation of apparatus employed to add the correlation signals obtained by the apparatus of FIG. 2, select the time difference value for each composite correlation signal, plot the time difference values for a series of pairs of geophone locations to obtain a time difference curve, perform a running integral of the time difference curve to obtain a dip curve, and subtract the dip curve from the time difference curve to obtain a time correction curve; and FIGS. 5, 6, 7 and 8 are graphic illustrations of a composite correlation signal, a time difference curve, a dip curve, and a time correction curve, respectively, as produced by the apparatus of FIG. 4.

Figure 1:
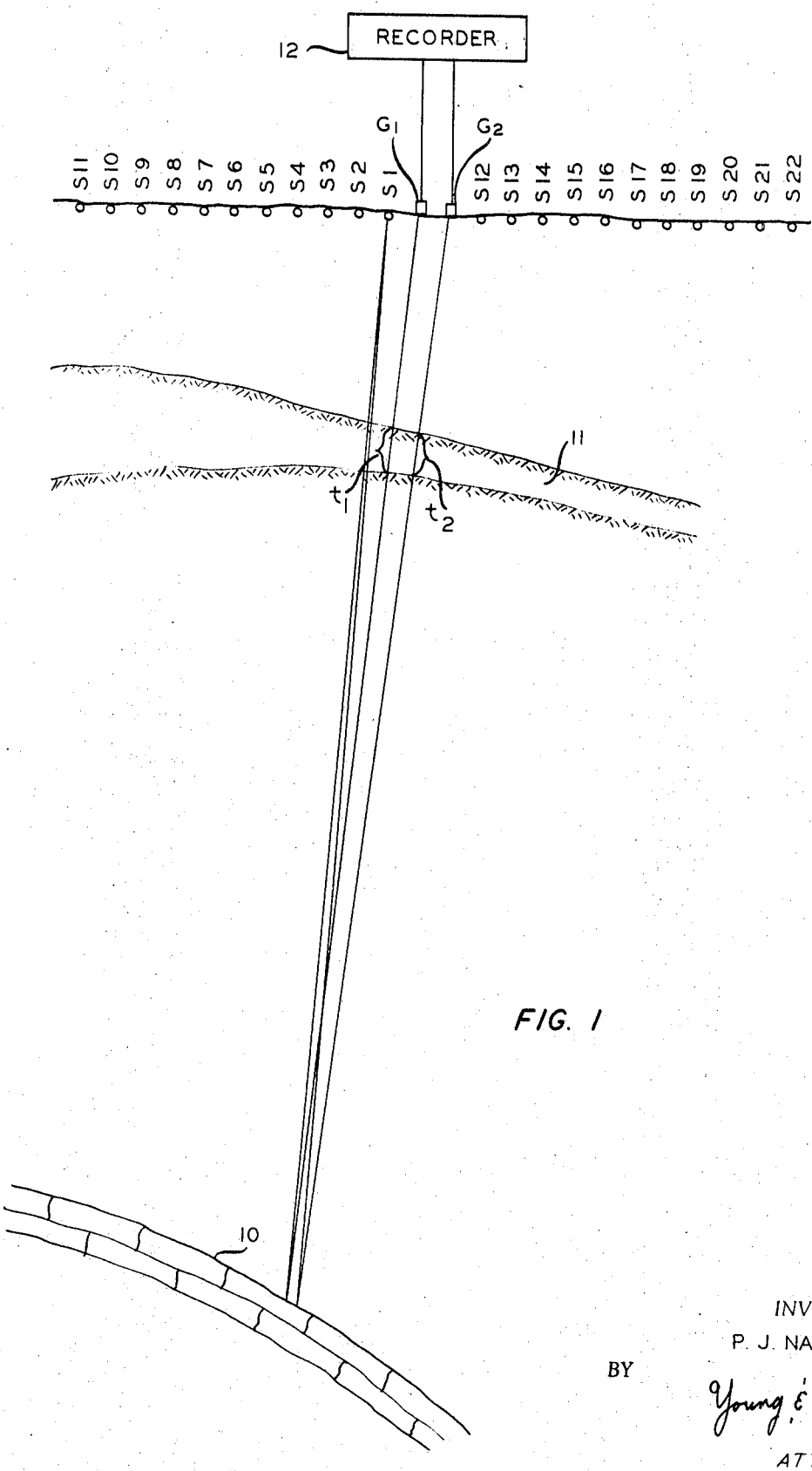
FIG. 1 is a schematic representation of a seismic exploration system.

Referring now to the drawing in detail and to FIG. 1 in particular, a seismic exploration system is illustrated schematically. Vibrations are imparted to the earth in sequence at a plurality of locations identified as shot points $S_1$ to $S_{22}$. This can readily be accomplished by detonating explosive charges at the corresponding shot points. The resulting vibrations travel downwardly through the earth and are reflected back to the surface from subterranean formations, such as 10. These vibrations are received at the surface of the earth by a plurality of geophones which are spaced on both sides of each shot point. In order to simplify the drawing, only two such geophones $G_1$ and $G_2$ are illustrated. However, in normal practice a relatively large number of these geophones are positioned on both sides of each shot point. Vibrations emitted from shot point $S_1$ are reflected from bed 10 and returned to respective geophones $G_1$ and $G_2$. Although not shown, vibrations from the remainder of the shot points $S_2$ to $S_{22}$ are also received in sequence by geophones $G_1$ and $G_2$.

It has been discovered that relatively shallow beds 11 often exist which transmit seismic vibrations at greatly varying rates. For example, these beds can be formed of materials which have been leached in part by subsurface fluids so as to leave slumps. In addition, these beds often vary in thickness so that the times of travel of the seismic vibrations through the beds at different locations vary considerably. Because of these beds, the travel times of vibrations from a common shot point to adjacent geophones often differ substantially. This makes the recognition of common reflection patterns in these several signals extremely difficult, if not impossible. The present invention provides a system for measuring the difference in travel times of the several reflections through bed 11. These times are shown as $t_1$ and $t_2$ for the vibrations received by respective geophones $G_1$ and $G_2$. Reflecting bed 10 is a considerable distance below bed 11. Thus, the downwardly moving vibrations follow substantially the same path through bed 11 and have the same travel times. Similarly, since bed 11 is close to the surface, the reflected vibrations received by geophones $G_1$ and $G_2$ from any of the shot points travel through substantially the same paths in bed 11 and have travel times $t_1$ and $t_2$, respectively.

The signals received by geophones $G_1$ and $G_2$ are applied to respective channels of a recorder 12. Magnetic tape recorders can be utilized to advantage for this purpose because the signals can readily be reproduced for subsequent manipulation. The signal received by geophone $G_1$ is subsequently reproduced and applied to input terminal 15 of FIG. 2. The recorded signal from geophone $G_2$ is simultaneously reproduced and applied to input terminal 16. Actually, these signals are applied between terminals 15 and 16 and a reference potential, such as ground. However, single terminals are illustrated in FIG. 2 to simplify the drawing. Terminals 15 and 16 are connected to the inputs of respective delay lines 17 and 18. These delay lines are provided with a plurality of spaced output terminals so as to provide a plurality of output signals which represent sequential values of the respective input signals. These delay lines can be conventional tapped electrical delay lines, for example. Input terminal 15 and the last output terminal of delay line 18 are applied as the respective inputs to a first multiplier 20a. The output of multiplier 20a is applied through an integrator 21a to a terminal 22a. Input terminal 15 and the remainder of the output terminals of delay line 18 are applied as respective inputs to a series of multipliers 20b ... 20n. The outputs of multipliers 20b ... 20n are applied through respective integrators 21b ... 21n to respective terminals 22b ... 22n. In a similar manner, input terminal 16 and the outputs of delay line 17 are applied as respective inputs to a plurality of multipliers 23a, 23b ...23n. The outputs of multipliers 23a, 23b ... 23n are applied through respective integrators 24a, 24b ...24n to respective terminals 25a, 25b ... 25n. A switch 26 is rotated by a motor 27 to engage the terminals in sequence. Switch 26 is connected to the input of a recorder 28.

Figure 3:
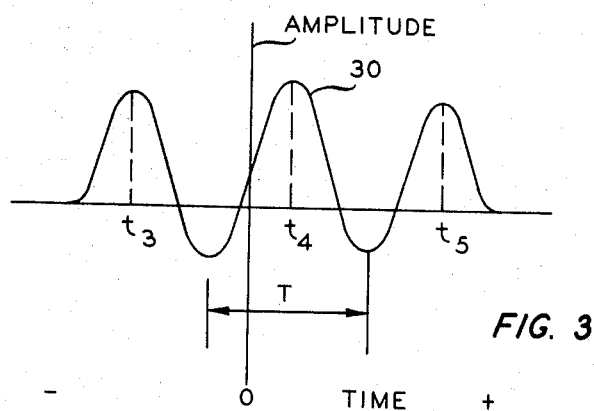
FIG. 3 is a graphical representation of a typical output signal from the circuit of FIG. 2.

The two input signals which are applied to terminals 15 and 16 are thus correlated with one another at various time differences therebetween. This correlation is a cross correlation wherein the individual signals are multiplied and the resulting product is integrated. The resulting signal applied to recorder 28 may have the configuration shown by curve 30 of FIG. 3, for example. FIG. 3 is a graphical representation of the amplitude of the signal applied to recorder 28 as a function of the time difference between increments of the individual input signals that are multiplied together. The positive time values, in effect, represent the amount one signal is delayed from the other when the correlation is performed, and the negative time values represent the amount the signals are delayed in the reverse order. Under ideal circumstances, curve 30 of FIG. 3 exhibits a sign single maximum peak which is clearly defined. When this occurs, the time at which this maximum appears is representative of the difference in time at which common reflections from bed 10 appear in the signals which are received at geophones $G_1$ and $G_2$. This time difference is representative of the dip of the reflecting formation and of the compensation required for all static corrections. Of course, angularity of path corrections still must be made in the usual manner. However, as shown in FIG. 3, several peaks often appear in curve 30 which make it difficult, if not impossible to identify the correct displacement time.

The next step in the procedure of this invention is to pick the time of occurrence of the correct maximum correlation of the signals received by geophones $G_1$ and $G_2$. This is as accomplished by adding a plurality of correlation signals for geophones $G_1$ and $G_2$ corresponding to a plurality of shot points, for example $S_1-S_{22}$. Referring again to FIG. 1, charges are detonated in sequence at shot points $S_2$ to $S_{22}$ and the corresponding vibrations received by geophones $G_1$ and $G_2$ are recorded. This provided 21 additional pairs of records which are correlated in the manner previously described to obtain a total of 22 signals of the type shown in FIG. 3. It should be evident that more or fewer signals can be used. However, the accuracy of the correlation is increased by employing a large number of signals.

Figure 5:
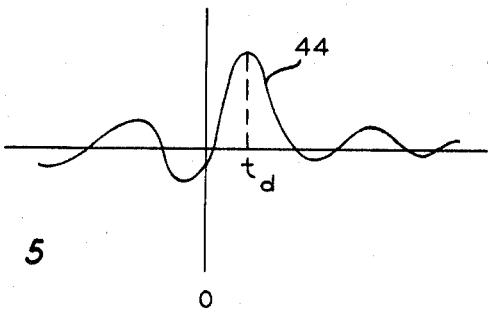
Figure 6:
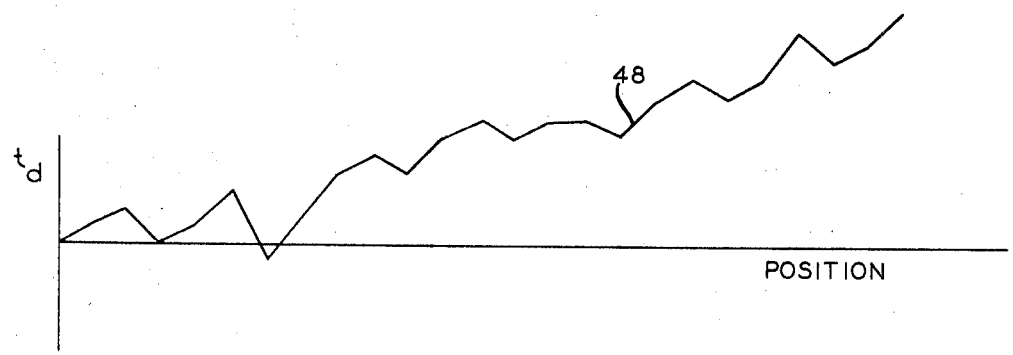
Figure 7:
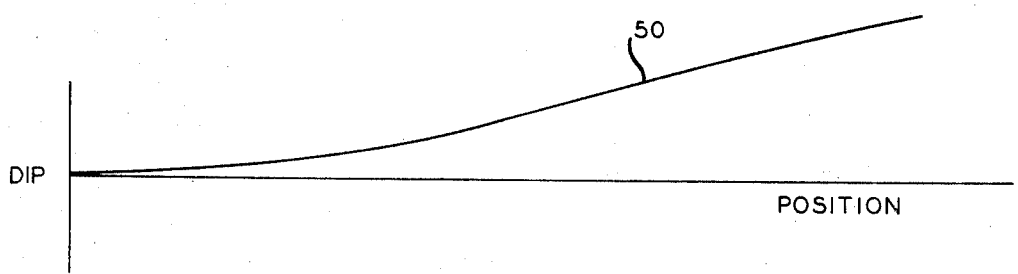
Figure 8:
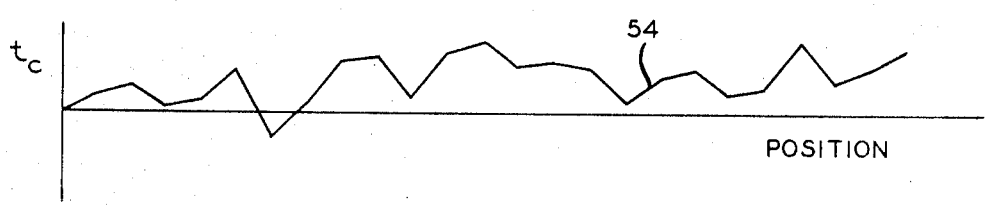

Referring now to FIG. 4, the correlation signals are transferred from respective storage points, for example recorders 28a—28, to multiplexer 40 where they are passed one at a time to analog-to-digital converter 41. The individual outputs of converter 41 are introduced into buffer register 42 wherein they are stored for an appropriate time and then passed to digital adder 43 wherein the individual correlation signals are added to produce a composite correlation signal having the general form illustrated by curve 44 in FIG. 5. The operation of multiplexer 40, converter 41 and register 42 are controlled by programmer 45. The output of digital adder 43 is transmitted to peak selector 46 wherein the time difference $t_d$ corresponding to the maximum peak as shown in FIG. 5 is determined and transmitted to plotter 47. This procedure is repeated for a plurality of pairs of geophone locations, for example geophone locations at $G_2$ and $S_{12}$, $S_{12}$ and $S_{13}$, $S_{13}$ and $S_{14}$ and so on, as shown in FIG. 1, with the $t_d$ of the composite correlation signal for each pair of geophone locations being transmitted to plotter 47 wherein the value of $t_d$ is plotted against the position of the pair of geophone locations to obtain a time difference curve having the general form of curve 48 in FIG. 6. The output of plotter 47 is introduced into integrator 49 wherein a running integration of the time difference curve is made to obtain a dip curve having the general form of curve 50 in FIG. 7. The output of integrator 49, which can be recorded by recorder 51 if desired, is passed to one input of subtractor 52. The output of plotter 47 is also passed through storage means 53 to a second input of subtractor 52 wherein the dip curve is subtracted from the time difference curve to obtain a time correction curve having the general form of curve 54 in FIG. 8, which can then be recorded by recorder 55. The operation of adder 43, peak selector 46, plotter 47, integrator 49, storage 53 and subtractor 52 can be controlled by programmer 56 which can be a part of programmer 45 or a separate programmer. Elements 43, 46, 47, 49, 52, 53 and 56 are suitably in the form of a digital computer, for example an IBM 7090 computer, or a special purpose computer designed for the particular operation.

The value of time correction from curve 54 compensates for all of the static corrections in seismic prospecting. A plurality of the seismic records can then be summed, for example, after the static time corrections are made. As is well known, such a summing procedure increases the signal to noise ratio because random noise vibrations tend to cancel one another.

Reasonable variations and modifications are possible within the scope of the foregoing disclosure, the drawing and the appended claims to the invention. For example the output of converter 41 can be placed on magnetic tape and stored before the introduction thereof to digital adder 43. Also, while adder 43 is preferably a digital adder, an analogue system can be utilized.

I claim:

1. Apparatus for processing seismic data which has been obtained by imparting vibrations to the earth sequentially at a plurality of first locations spaced from one another, and separately recording vibrations reflected from subterranean formations to each adjacent pair of a plurality of second locations spaced from one another at the surface of the earth to provide a plurality of pairs of seismic signals for each adjacent pair of said plurality of second locations, each pair of seismic signals for a given pair of said plurality of second locations being representative of vibrations imparted to the earth from a respective different one of said plurality of first locations; comprising means for producing a cross correlation signal for each of said pairs of seismic signals; and means for automatically adding the cross correlation signals for each of said pairs of seismic signals for each of said adjacent pairs of said plurality of second locations to produce a composite correlation signal for each of said adjacent pairs of said plurality of second locations, for automatically determining the time difference of each of the composite correlation signals corresponding to the maximum peak value of the respective composite correlation signal, for automatically plotting the values of time difference thus determined versus the location of the respective adjacent pair of said plurality of second locations to form a time difference curve, for automatically making a running integration of the time difference curve to obtain a dip curve, and for automatically subtracting said dip curve from said time difference curve to produce a time correction curve.

2. Apparatus for processing seismic data which has been obtained by imparting vibrations to the earth sequentially at a plurality of first locations spaced from one another, and separately recording vibrations reflected from subterranean formations to each adjacent pair of a plurality of second locations spaced from one another at the surface of the earth to provide a plurality of pairs of seismic signals for each adjacent pair of said plurality of second locations, each pair of seismic signals for a given pair of said plurality of second locations being representative of vibrations imparted to the earth from a respective different one of said plurality of first locations; comprising means for automatically producing a cross correlation signal for each of said pairs of seismic signals, for automatically adding the cross correlation signals for each of said pairs of seismic signals for each of said adjacent pairs of said plurality of second locations to produce a composite correlation signal for each of said adjacent pairs of said plurality of second locations, for automatically determining the time difference of each of the composite correlation signals corresponding to the maximum peak value of the respective composite correlation signal, for automatically plotting the values of time differences thus determined versus the location of the respective adjacent pair of said plurality of second locations to form a time difference curve, for automatically making a running integration of the time difference curve to obtain a dip curve, and for automatically subtracting said dip curve from said time difference curve to produce a time correction curve.

3. Apparatus for processing seismic data which has been obtained by imparting vibrations to the earth sequentially at a plurality of first locations spaced from one another, and separately recording vibrations reflected from subterranean formations to each adjacent pair of a plurality of second locations spaced from one another at the surface of the earth to provide a plurality of pairs of seismic signals for each adjacent pair of said plurality of second locations, each pair of seismic signals for a given pair of said plurality of second locations being representative of vibrations imparted to the earth from a respective different one of said plurality of first locations, comprising cross correlation means for receiving each of said pairs of seismic signals and for automatically producing a cross correlation signal for each of said pairs of seismic signals; and fully automated means, connected to the output of said cross correlation means, for receiving and storing each said cross correlation signal, for receiving the thus stored cross correlation signals and for adding the cross correlation signals for each of said pairs of seismic signals for each of said adjacent pairs of said plurality of second locations to produce a composite correlation signal for each adjacent pairs of said plurality of second locations, for receiving each composite correlation signal and determining the value of the time difference of each composite correlation signal corresponding to the maximum peak value of the respective composite correlation signal, for receiving and storing the thus obtained values of time difference in correlation with the location of the respective adjacent pair of said plurality of second locations, the correlation of the thus obtained values of time difference versus the location of the respective adjacent pair of said plurality of second locations being representable as a time difference curve, for receiving and making a running integral of said thus obtained values of time difference in correlation with the location of the respective adjacent pair of said plurality of second locations, the resulting values of the running integral being representable as a dip curve, and for subtracting said values of the running integral from corresponding values of time difference to obtain time correction values, the correlation of said time correction values with the corresponding location of the respective adjacent pair of said plurality of second locations being representable as a time correction curve.

4. A machine implemented method of seismic surveying which comprises utilizing apparatus to impart vibrations to the earth sequentially at a plurality of first locations spaced from one another, utilizing apparatus to separately record vibrations reflected from subterranean formations to each adjacent pair of a plurality of second locations spaced from one another at the surface of the earth to provide a plurality of pairs of seismic signals for each adjacent pair of said plurality of second locations, each pair of seismic signals for a given pair of said plurality of second locations being representative of vibrations imparted to the earth from a respective different one of said plurality of first locations, utilizing fully automated apparatus to produce a cross correlation signal for each of said pairs of seismic signals, utilizing fully automated apparatus to add the cross correlation signals for each of said pairs of seismic signals for each of said adjacent pairs of said plurality of second locations to produce a composite correlation signal for each of said adjacent pairs of said plurality of second locations, utilizing fully automated apparatus to determine the time difference of each of the composite correlation signals corresponding to the maximum peak value of the respective composite correlation signal, utilizing fully automated apparatus to plot the values of time difference thus determined versus the location of the respective adjacent pair of said plurality of second locations to form a time difference curve, utilizing fully automated apparatus to make a running integration of the time difference curve to obtain a dip curve which is representative of the dip of the reflecting formation, utilizing fully automated apparatus to subtract said dip curve from said time difference curve to produce a time correction curve which is representative of the value of the time correction to be made in the displacement between the individual signals of each pair of said seismic signals corresponding to each respective one of said adjacent pairs of said plurality of second locations.

5. A machine implemented method of processing seismic data which has been obtained by imparting vibrations to the earth sequentially at a plurality of first locations spaced from one another, and separately recording the resulting vibrations reflected from subterranean formations to each adjacent pair of a plurality of second locations spaced from one another at the surface of the earth to provide a plurality of pairs of seismic signals for each adjacent pair of said plurality of second locations, each pair of seismic signals for a given pair of said plurality of second locations being representative of vibrations imparted to the earth from a respective different one of said plurality of first locations; comprising applying the individual signals of each of said pairs of seismic signals to respective inputs of a multiplier and therein multiplying each of said individual signals of the respective pair of seismic signals by one another with a plurality of time relationships therebetween; applying the resulting multiplication products to the input of an integrator and therein integrating each of said resulting multiplication products; passing each of the resulting integrals to a plotter and therein plotting the resulting integral of each of said resulting multiplication products against the value of the respective time relationship to obtain a cross correlation signal for each of said pairs of said seismic signals; and applying the thus obtained cross correlation signals to fully automated apparatus and therein adding the cross correlation signals for each of said pairs of seismic signals for each of said adjacent pairs of said plurality of second locations to produce a composite correlation signal for each of said adjacent pairs of said plurality of second locations, determining the time difference of each of the composite correlation signals corresponding to the maximum peak value of the respective composite correlation signal, recording the values of time difference thus determined versus the location of the respective adjacent pair of said plurality of second locations to form a time difference curve, produced to a running integrator making a running integration of the time difference curve to obtain the corresponding dip curve, and subtracting said dip curve from said time difference curve to produce a time correction curve.

6. A machine implemented method of seismic surveying which comprises utilizing apparatus to impart vibrations to the earth sequentially at a plurality of first locations spaced from one another; utilizing apparatus to separately record the resulting vibrations reflected from subterranean formations to each adjacent pair of a plurality of second locations spaced from one another at the surface of the earth to provide a plurality of pairs of seismic signals for each adjacent pair of said plurality of second locations, each pair of seismic signals for a given pair of said plurality of second locations being representative of vibrations imparted to the earth from a respective different one of said plurality of first locations; automatically applying by programmed machine implementation the individual signals of each of said pairs of seismic signals to respective inputs of a multiplier and therein multiplying each of said individual signals of the respective pair of seismic signals by one another with a plurality of time relationships therebetween; automatically applying by programmed machine implementation the resulting multiplication products to the input of an integrator and therein integrating each of said resulting products; automatically passing by programmed machine implementation each of the resulting integrals to a plotter and therein plotting the resulting integral of each said resulting products against the value of the respective time relationship to obtain a cross correlation signal for each of said pairs of said seismic signals; and automatically applying by programmed machine implementation the thus obtained cross correlation signals to an automatic computing means and therein adding the cross correlation signals for each of said pairs of seismic signals for each of said adjacent pairs of said plurality of second locations to produce a composite correlation signal for each of said adjacent pairs of said plurality of second locations, determining the time difference of each of the composite correlation signals corresponding to the maximum peak value of the respective composite correlation signal, recording the values of time difference thus determined versus the location of the respective adjacent pair of said plurality of second locations to form a time difference curve, making a running integration of the time difference curve to obtain the corresponding dip curve, and subtracting said dip curve from said time difference curve to produce a time correlation curve.

7. A machine implemented method of processing seismic data which has been obtained by imparting vibrations to the earth sequentially at a plurality of first locations spaced from one another, and separately recording the resulting vibrations reflected from subterranean formations to each adjacent pair of a plurality of second locations spaced from one another at the surface of the earth to provide a plurality of pairs of seismic signals for each adjacent pair of said plurality of second locations, each pair of seismic signals for a given pair of said plurality of second locations being representative of vibrations imparted to the earth from a respective different one of said plurality of first locations; comprising utilizing fully automated apparatus to produce a cross correlation signal for each of said pairs of seismic signals, utilizing fully automated apparatus to add the cross correlation signals for each of said pairs of seismic signals for each of said adjacent pairs of said plurality of second locations to produce a composite correlation signal for each of said adjacent pairs of said plurality of second locations, utilizing fully automated apparatus to determine the time difference of each of the composite correlation signals corresponding to the maximum peak value of the respective composite correlation signal, utilizing fully automated apparatus to plot the values of time difference thus determined versus the location of the respective adjacent pair of said plurality of second locations to form a time difference curve, utilizing fully automated apparatus to make a running integration of the time difference curve to obtain a dip curve which is representative of the dip of the reflecting formation, utilizing fully automated apparatus to subtract said dip curve from said time difference curve to produce a time correction curve which is representative of the value of time correction to be made in the displacement between the individual signals of each pair of said seismic signals corresponding to each respective one of said adjacent pairs of said plurality of second locations.

UNITED STATES PATENT OFFICE
CERTIFICATE OF CORRECTION

Patent No. 3,568,143                          Dated: March 2, 1

Paul J. Naquin, Jr.

It is certified that error appears in the above-identified patent and t Letters Patent are hereby corrected as shown below:

Column 5, line 37, after "each" insert -- of said --. Column 6, 1 delete "produced to a"; line 58, delete "running integrator".

Signed and sealed this 20th day of November 1973.

(SEAL)
Attest:

EDWARD M. FLETCHER, JR.                  RENE D. TEGTMEYER
Attesting Officer                              Acting Commissioner of Paten